United States Patent
Kosaka et al.

(10) Patent No.: US 6,317,554 B1
(45) Date of Patent: Nov. 13, 2001

(54) SELF-WAVEGUIDE OPTICAL CIRCUIT

(75) Inventors: Hideo Kosaka, Tokyo; Shojiro Kawakami, Miyagi, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,243

(22) Filed: Aug. 5, 1999

(30) Foreign Application Priority Data

Aug. 5, 1998 (JP) .................................................. 10-221243

(51) Int. Cl.[7] ...................................................... G02B 6/10
(52) U.S. Cl. ........................... 385/132; 385/14; 359/321; 359/322
(58) Field of Search .................... 385/8, 10, 30, 385/31, 37, 129, 131, 132, 147, 42, 45, 92, 14, 15, 16, 32, 130; 359/321, 322

(56) References Cited

U.S. PATENT DOCUMENTS

| | | | | |
|---|---|---|---|---|
| 5,526,449 | * | 6/1996 | Meade et al. | 385/14 |
| 5,600,483 | * | 2/1997 | Fan et al. | 359/344 |
| 6,058,127 | * | 5/2000 | Joannopoulos et al. | 372/92 |
| 6,093,246 | * | 7/2000 | Lin et al. | 117/928 |
| 6,134,369 | * | 3/1999 | Kurosawa | 385/132 |

OTHER PUBLICATIONS

Wada et al., "Far–infrared transmittance and band–structure correspondence in two–dimensional air–rod photonic crystals," Physical Review B, vol. 55, No. 16, Apr. 15, 1997, pp. 10 443–10 450.

* cited by examiner

Primary Examiner—Georgia Epps
Assistant Examiner—Tuyen Tra
(74) Attorney, Agent, or Firm—Young & Thompson (57) ABSTRACT

Disclosed herein is a self-waveguide optical circuit for forming optical paths by propagating rays or electromagnetic waves comprising: photonic crystals having a dielectric constant periodic structure or a dielectric constant semi-periodic structure having a period substantially corresponding to a wavelength of propagation rays, and optical paths formed by establishing a crystal direction of the photonic crystal to level the dispersion surface of the photonic crystal for obtaining a bundle of parallel rays. In accordance with the present invention, elevation of characteristics such as miniaturization, high integration, high speed operation and transmission efficiency can be obtained because a bundle of parallel rays can be obtained without forming crooked parts having an excessive curvature radius.

2 Claims, 8 Drawing Sheets

INCIDENT RAY
$\lambda = 0.956 \mu m$

SiO2 (n=1.46) 0.16 μm
a-Si (n=3.24) 0.16 μm
SiO2 buffer
Si substrate
0.33 μm

SELF-WAVEGUIDE OPTICAL CIRCUIT

BACKGROUND OF THE INVENTION (a) Field of the Invention

The present invention relates to a self-waveguide optical circuit, more in detail to the self-waveguide optical circuit which may easily implement miniaturization, high integration and high speed operation, has an excellent transmission efficiency, and is suitably employed in technical fields such as optical communication, optical control and optical information processing.

(b) Description of the Related Art

Conventional optical circuits can be largely divided into free space propagation optical circuits and waveguide optical circuits.

The free space propagation optical circuit defines optical paths by combining individual optical components such as a collimator, a lens and a reflection mirror without formation of waveguides.

As the collimator for obtaining a bundle of parallel rays among the above optical components, a lens or a concave mirror is employed. A slit or a pinhole formed on the focus of the lens or the concave mirror is precisely adjusted to obtain the bundle of parallel rays.

The waveguide optical circuit is generally realized by forming waveguides by embedding materials having different refractive indexes in the form of railroad tracks and by guiding rays by employing total reflection conditions for rays from the materials.

Figure 1:
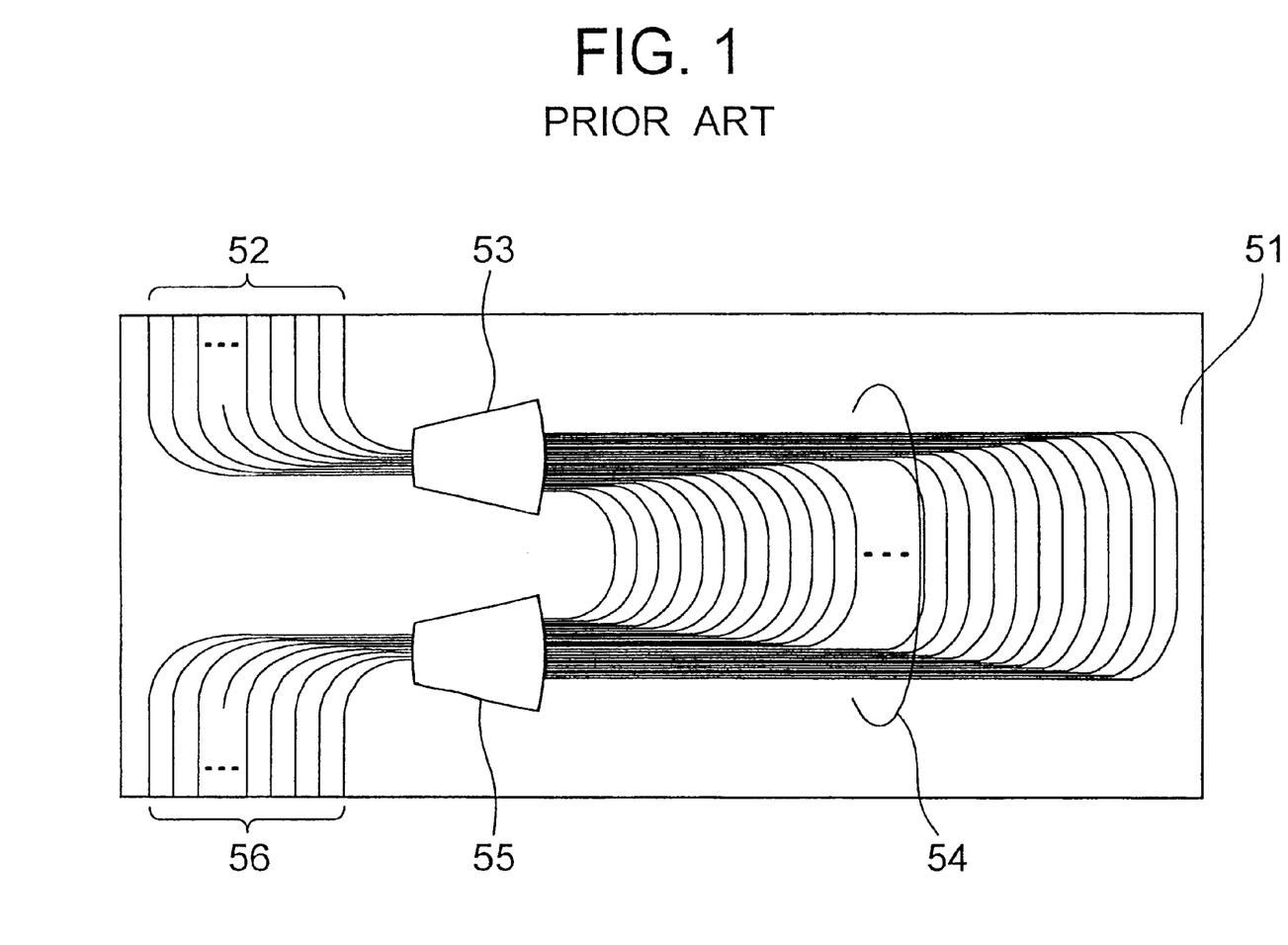
FIG. 1 is a top plan view of a conventional array-type waveguide lattice.

An example of this waveguide optical circuit is shown in page 272 of volume 4 of advance manuscripts of springtime meeting of Denshi Jouhou Tsuushin Gakkai (Electronics Information and Communication Society) published in 1992 by Takahashi, et al. A top plan view of an array-type waveguide lattice described therein is shown in FIG. 1.

In this example, quartz-based optical waveguides are formed on a waveguide substrate 51 made of silicon, and a waveguide optical circuit includes 11 input ray waveguides 52, an input side star coupler 53, an array-type waveguide lattice 54, an output side star coupler 55 and output waveguides 56.

In another example of the waveguide optical circuit, a possibility is reported that a linear defective structure may be intentionally introduced in a photonic crystal and rays are guided or crooked along the linear defects.

Figure 2:
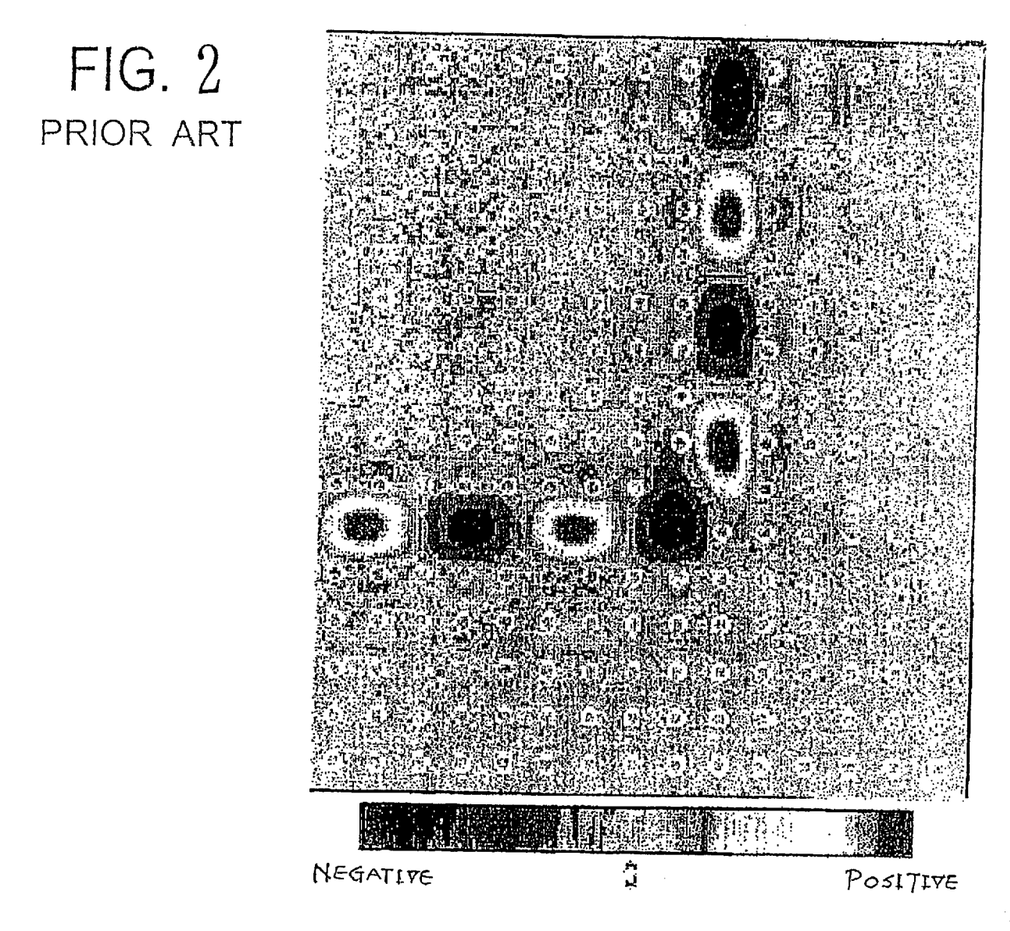
FIG. 2 is a top plan view of a conventional waveguide optical circuit employing photonic crystals.

FIG. 2 is a top plan view of a waveguide optical circuit employing photonic crystals described in page 3787, vol.28 of Physical Review Letters in 1996 by A. Mekis et al.

A principle of guiding waves is as follows. The linear defects introduce a guided mode to a wavelength band which has no optical propagation when the crystal is complete. Incident rays selectively exciting this mode are guided along the linear defects. In the ray-propagation mode, only the guided mode is present in the linear defects even in the crooked part. Since, accordingly, incident rays from the incident side-waveguide to the crooked part have no outlet other than the outlet side- waveguides, the rays can propagate along the steep crooked part without loss.

A self-focusing phenomenon may be utilized for self-propagating guided waves without employing structural waveguides. This phenomenon is described, for example, in page 6 of vol.XII of "Progress in Optics" edited by E. Wolf.

This phenomenon can be simply described as follows. A refractive index of a ray in a medium slightly increases with strength of the ray. When, accordingly, a strong bundle of rays passes through the medium, a wavefront is inwardly curved because a phase velocity at the central part thereof having the stronger rays becomes lower than that at the peripheral part thereof having the weaker rays. Although, on the other hand, the bundle of rays is likely to spread due to diffraction, the bundle of rays focuses to one point after propagation of a certain distance if the rays are sufficiently strong and the influence of the refractive index is larger than that of the diffraction.

Accordingly, if the influences of the refractive index and of the diffraction are balanced, the bundle of rays propagates as parallel rays having a specified spread distance. The dependency of the refractive index on the strength of the rays is an effect of a tertiary nonlinear refractive index possessed by a medium known as Kerr effect, and the dependency is proportional to a square of strength of rays.

However, the conventional free space propagation optical circuits and waveguide optical circuits have the following problems.

The free space propagation optical circuits have problems in connection with a collimator. A first problem is that severe conditions are imposed to an accuracy of determining a position of an optical point source or a pinhole, that is, to a divergent angle of an incident ray. This requires a high accuracy of position adjustment of optical elements to elevate a mounting cost. A second problem is that the collimator itself is large and requires a large volume for mounting. This is because a lens as large as an optical source or a pinhole can be regarded as an optical point source is necessary. As a result, a subsidiary problem arises that a spot size of an exit ray becomes larger than the size of the optical source or the pinhole.

In the waveguide optical circuits, waveguides are difficult to be crooked at a steep angle. Since a curvature radius in the order of centimeter is necessary under the present circumstances, the whole circuit inevitably has the order of centimeter and miniaturization is difficult.

Since the total reflection conditions are employed as a principle of guiding rays as mentioned earlier, a steep crook invites a large radiation loss.

Although formation of a complete crystal having a wavelength band in which no propagation of rays occurs and introduction of a linear defective structure are required in the self-waveguide optical circuit employing the photonic crystals, realization of the complete crystal is technically difficult under the present circumstances.

It is extremely difficult to intentionally introduce the defective structure into the complete crystal for forming linear or crooked waveguides. For example, in order to constitute such a linear or crooked waveguide structure in a wavelength band of rays around 1.5 micronmeters employed for current optical communications, control of processing in the order of at least 0.1 micronmeter and a high aspect ratio are required, and these are extremely difficult under the present circumstances of techniques.

Since the effect is proportional to a square of strength of rays in the self-waveguide circuit employing the self-focusing, precise control of the strength of rays is needed for obtaining a balance with a spread of diffraction.

In order to maintain conditions of this balance, steadiness of the strength of rays must be guaranteed. However, absorption is generally increased due to a resonance effect in a wavelength band having a large non-linearity, and a phenomenon in which the strength of rays is attenuated along the propagation direction is difficult to be avoided.

Of course, even a non-resonance region having a lesser absorption effect has a non-linear constant to some degree. In this case the strength of rays must be sufficiently high which reaches to an unrealistic value (watt-level) in an optical circuit having a purpose of information processing or optical connection of a short distance.

As apparent from foregoing, the free space propagation optical circuits requiring the collimator become large-scaled, and the waveguide optical circuits requiring the large curvature radius also become large-scaled. Attainment of miniaturization, high integration and high speed operation is difficult in all of the conventional optical circuits, and accordingly elevation of a transmission efficiency is also difficult.

SUMMARY OF THE INVENTION

It is therefore an object of the present invention, in view of the above, to provide an optical circuit which enables miniaturization, high integration and high speed operation and also has an excellent transmission efficiency.

The present invention provides a self-waveguide optical circuit comprising: a light source; photonic crystals having a dielectric constant-periodic structure or a dielectric constant-semi-periodic structure having a period substantially corresponding to a wavelength of propagation rays input from the light source; optical paths formed by establishing crystal directions of the photonic crystals for leveling the dispersion surfaces of the photonic crystals for obtaining a bundle of parallel rays having a high degree of parallel in a self guided mode; and one or more optical receptors receiving the propagation rays.

In accordance with the present invention, a bundle of parallel rays can be obtained by employing photonic crystals of which dispersion surfaces are directions are leveled.

Effects obtained thereby are as follows.

A first effect is elevation of characteristics or performances such as miniaturization, high integration, high speed operation and a transmission efficiency. The reasons thereof are that a bundle of parallel rays can be obtained without employing an individual optical element such as a lens, and no crooked parts having an excessive curvature radius are necessary because a large refraction angle of propagation rays can be obtained.

A second effect is elevation of productivity. The reason thereof is that the number of elements manufactured from a wafer having the same surface area increases because an element size is reduced by the first effect. The productivity can be also elevated by eliminating a step of position adjustment required when individual optical devices are mounted.

A third effect is that the bundle of parallel rays is obtained and preserved without an influence of absorption by substrate material even if incident rays are weak. The degree of parallel is kept almost constant not so largely dependent on a spread angle of incident rays, and a beam width sufficiently narrow to be applied to an optical circuit can be obtained.

An excellent optical apparatus produced with a low cost can be realized by applying the self-waveguide optical circuit of the present invention thereto.

The above and other objects, features and advantages of the present invention will be more apparent from the following description.

PREFERRED EMBODIMENTS OF THE INVENTION

The present inventors regard that the following requisites are necessary for realizing a target optical circuit.

(1) A first requisite is to miniaturize the circuit having a size lower than the order of millimeter without employing an individual element such as a lens.

(2) A second requisite is to eliminate a step of position adjustment in case of mounting.

(3) A third requisite is to obtain a bundle of parallel rays even if incident rays are weak, and to maintain this condition without being affected by absorption of a medium. It is also required that the condition of forming the parallel rays is kept constant not so largely dependent on a spread angle of incident rays, and a beam width sufficiently narrow to be applied to an optical circuit is obtained.

The target optical circuit can be obtained by forming the steep crooking without the radiation loss as well as the linear wave guiding function, which eventually realizes the miniaturization, the high integration and the high speed operation of the whole circuit. The miniaturization and the high integration remarkably reduce the overall manufacturing cost of the optical circuit.

In the present invention, an optical path in the photonic crystal is crooked with a specified curvature radius while maintaining a bundle of parallel rays suitably by changing a dielectric constant-periodic structure of the photonic crystal. To the contrary, the rays may be widely distributed by intentionally shifting the conditions of producing parallel rays for selecting a crystal direction of forming a convex dispersion surface to generate spread rays. The rays can be focused by intentionally shifting the conditions of producing parallel rays for selecting a crystal direction of forming a concave dispersion surface to generate focused rays.

Suitably, the photonic crystals are formed in an optical circuit substrate. The propagation rays having a low divergent angle exit from the exit end of the photonic crystals by directly connecting an optical element such as a razor, an LED and an optical fiber to the self-waveguide optical circuit at the incident end of the photonic crystals.

The present invention achieves its object by utilizing a unique dispersion surface of the photonic crystal as mentioned below.

The photonic crystal employed in the present invention is composed of two or more kinds of mediums having different dielectric constants disposed periodically or semi-periodically. As an example thereof, a tertiary photonic crystal having a triangular lattice arrangement in a direction of a crystal surface and a two-layer alternate period in a direction of medium layers is shown in FIGS. 3A, 3B and 3C.

Figure 3A:
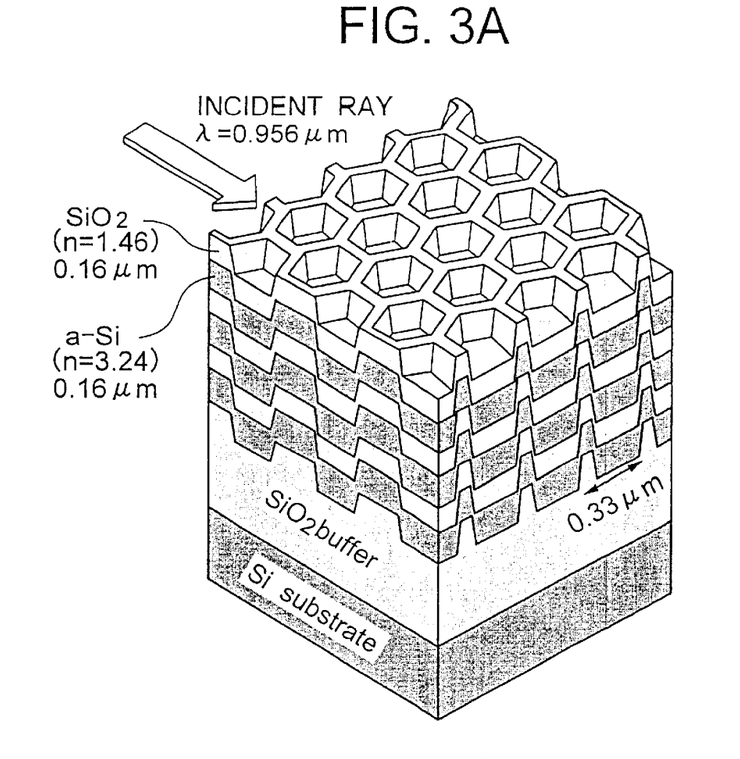
FIG. 3A is a perspective view of a photonic crystal employable in a self-waveguide optical circuit of the present invention.
Figure 3B:
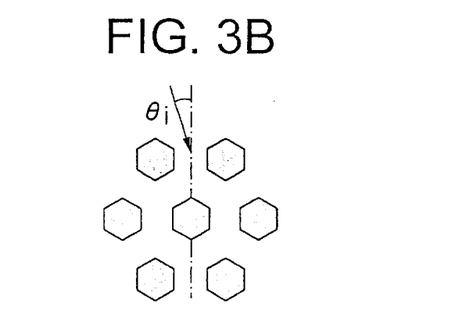
FIG. 3B is a schematic top plan view thereof and FIG. 3C is a schematic view showing a reverse lattice space.
Figure 3C:
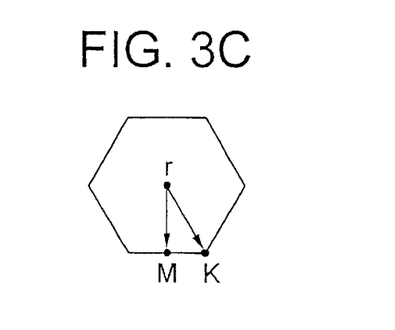
Figure 4A:
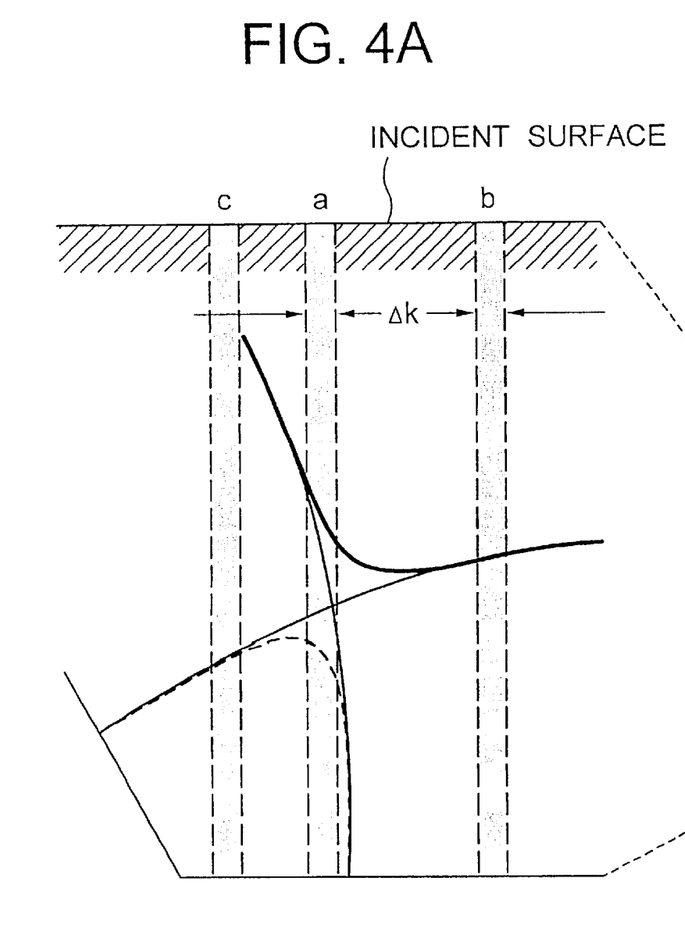
FIG. 4A illustrates a dispersion surface of photonic crystals employed in Embodiments.
Figure 4B:
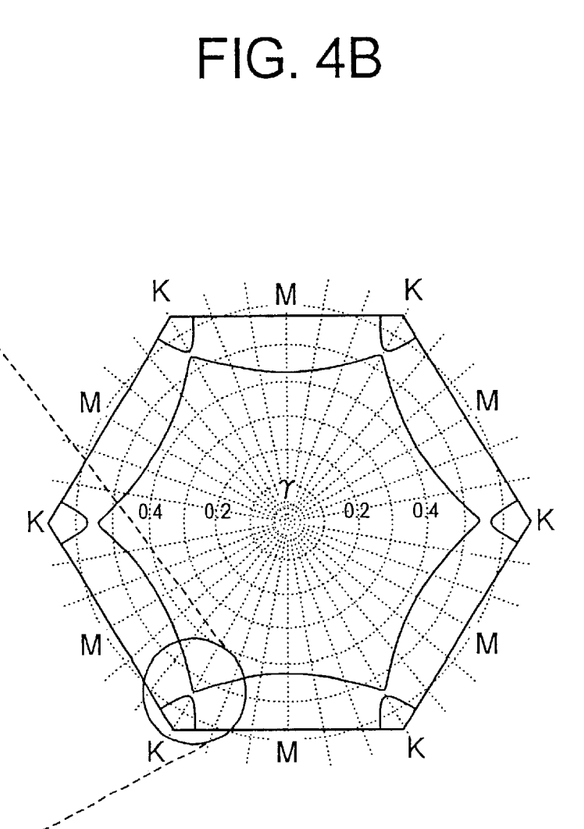
FIG. 4B shows its configuration.

One dispersion surface corresponding to a certain wavelength of the photonic crystal shown in FIGS. 3A to 3C has a configuration shown in FIG. 4B according to photonic band calculation. The propagation ray in the crystal preserves a wave number "k" in a horizontal direction with regard to a crystal surface of an incident ray, and is known to move in a normal direction with regard to the dispersion surface.

The horizontal direction wave number "k" of the incident ray has some degree of a spread (Δk), and the distribution of the propagation direction in the crystal may be generated depending on the above spread. If incident rays corresponding to a wave number "a" shown in FIG. 4A are entered, a wide spread of the rays toward a propagation direction is produced because a dispersion surface has a large curvature.

A curvature of a dispersion surface of a wave number "b" corresponds to an inflection point changing from a downward convex to an upward convex, and the dispersion surface has a locally linear part. Accordingly, incident rays having a wave number corresponding to "b" are entered, a spread of the propagation rays becomes to approximately zero to make a bundle of parallel rays.

Figure 5:
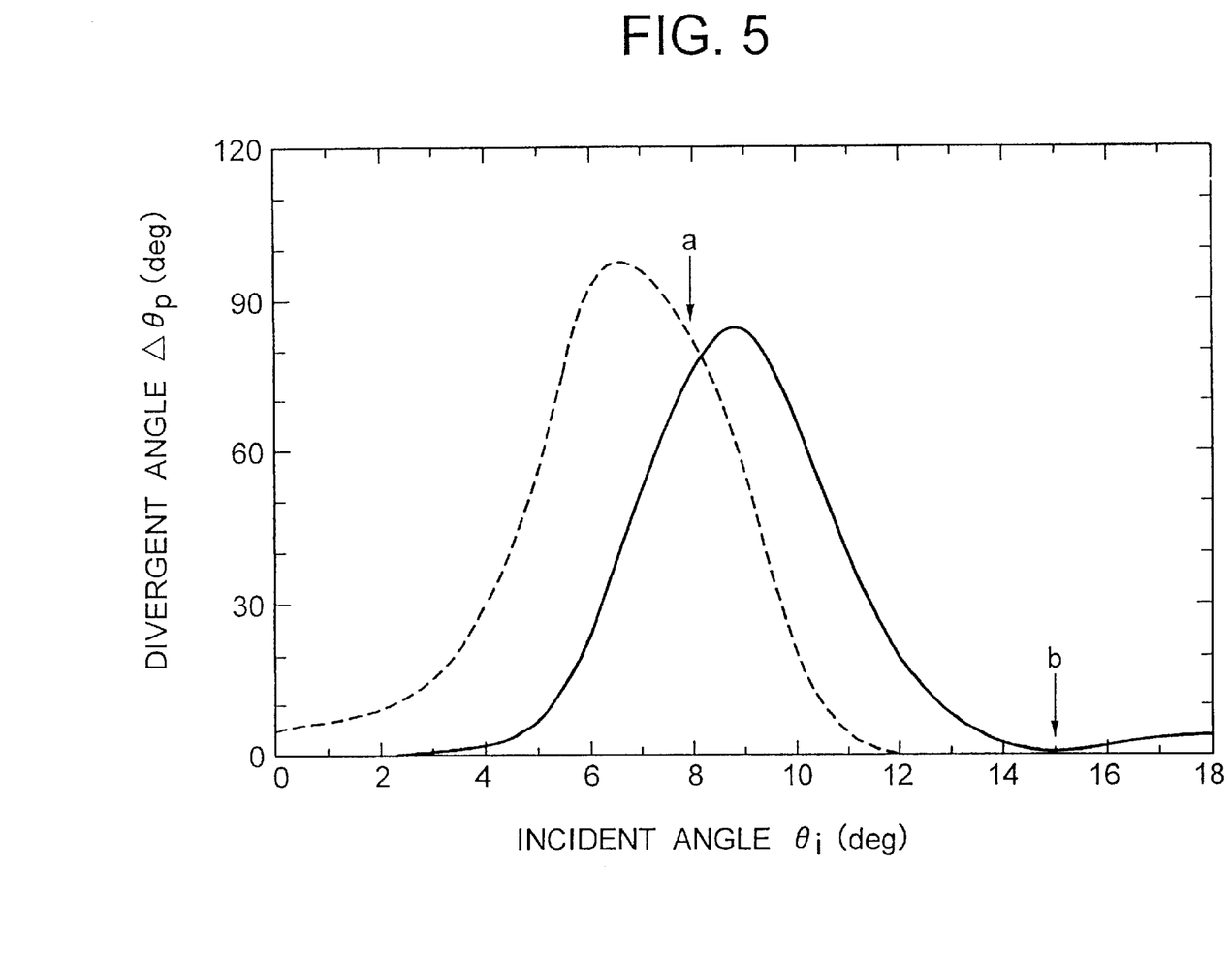
FIG. 5 is a graph showing a dependence of in-crystal propagation angle spread on an incident angle.

A dependence of an in-crystal propagation angle spread on an incident angle is shown in FIG. 5 when the spread of the incident ray angles of the incident rays is assumed to be 4 degree. When the incident angle is 8 degree, the in-crystal propagation angle spread becomes as large as about 70 degree. When, on the other hand, the incident angle is 15 degree, the spread becomes about 0 degree to produce a bundle of parallel rays.

Figure 6A:
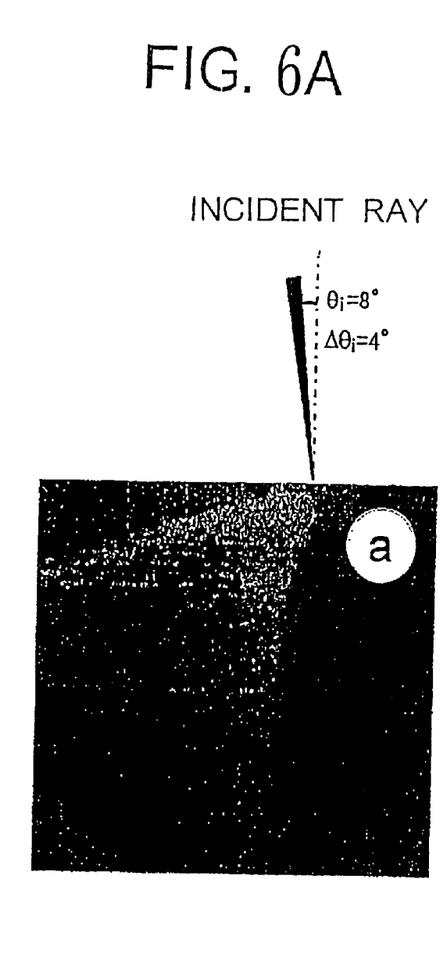
FIGS. 6A and 6B are photographs showing images observed by CCD of internally propagation rays in photonic crystals employed in Embodiments.
Figure 6B:
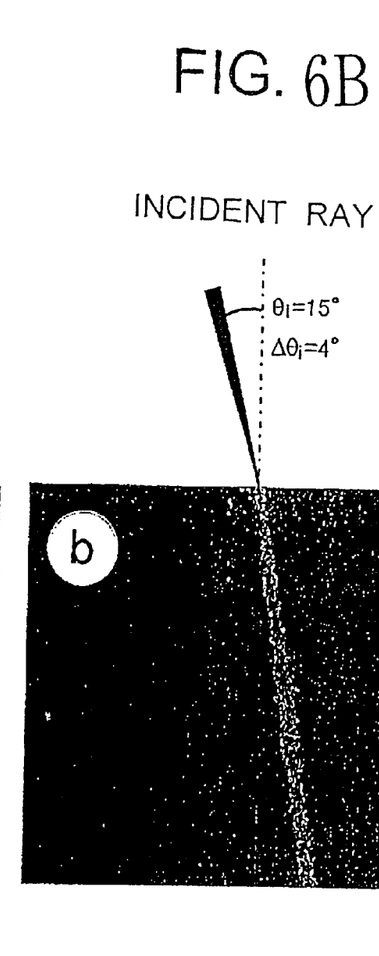

After making the above situation, the respective incident rays were observed. FIGS. 6A and 6B are photographs showing these rays. The rays were made parallel by making the spread angle of the incident rays 4 degree.

The above-mentioned crooking can be controlled to have a desired direction by disposing divided photonic crystal regions in an optical waveguide substrate as will be described in connection with Embodiment 1 shown in FIG. 7.

This can be understood from the viewpoint that the dispersion surface shown in FIGS. 4A and 4B is seen to relatively rotate by rotation of the incident edge surface. That is, a "k" preserving rule in a direction parallel to the incident surface can be controlled by rotation of the crystal surface.

Now, the present invention is more specifically described with reference to accompanying drawings.

Embodiment 1

Figure 7:
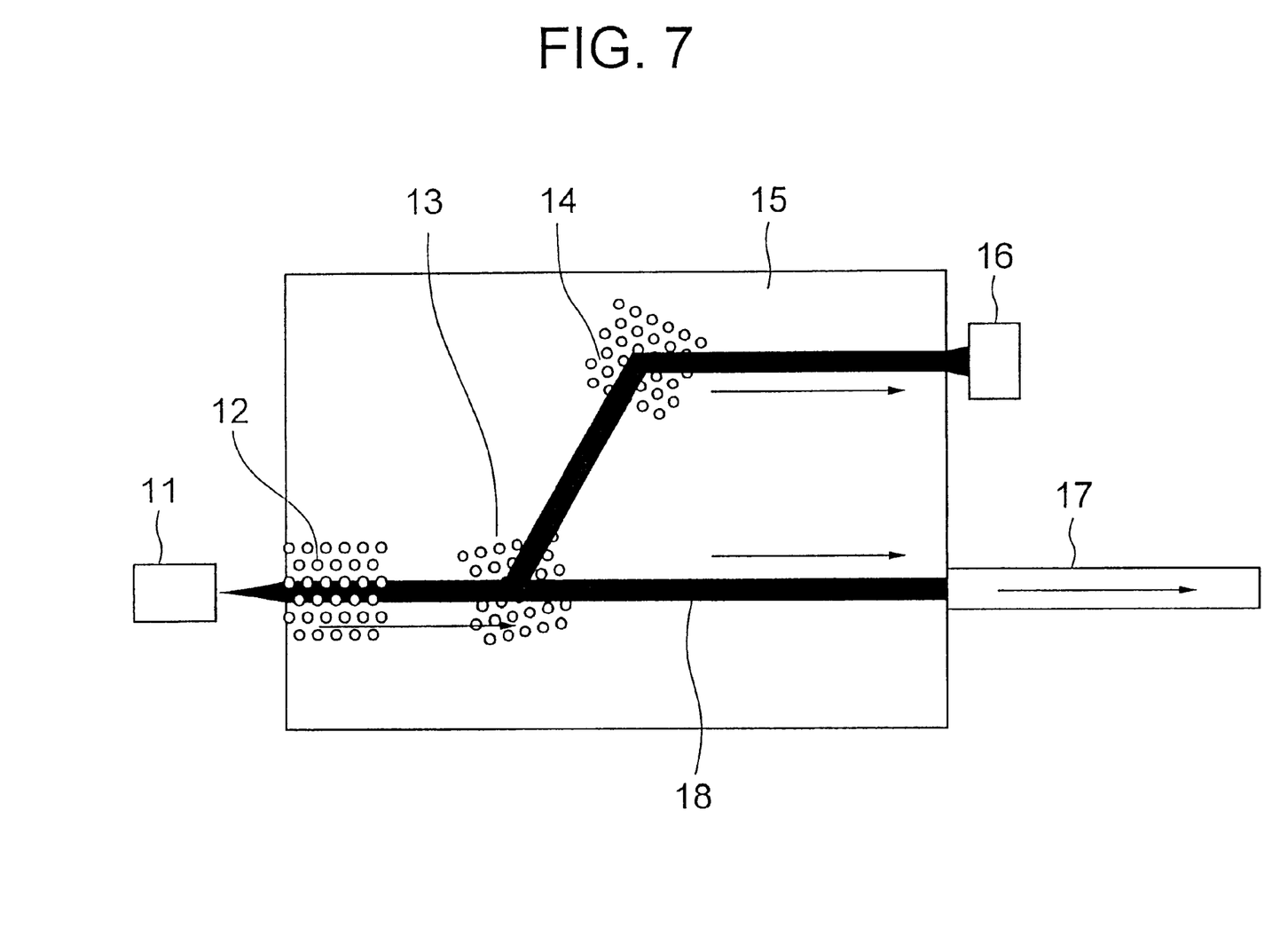
FIG. 7 is a schematic view showing Embodiment 1 of a self-waveguide optical circuit in accordance with the present invention.

As shown in FIG. 7, a self-waveguide optical circuit of the present invention is formed by an optical circuit substrate 15, a razor 11 and a receptor element 16 connected to the both edges of the optical circuit substrate 15, and an optical fiber 17. In the optical circuit substrate 15, a first photonic crystal 12, a second photonic crystal 13 and a third photonic crystal 14 are partially formed.

As described later, rays propagate from the razor 11 to the optical fiber 17 and to the receptor element 16 through the photonic crystals 12, 13 and 14. Part of the rays diverge at the photonic crystal 13 to enter into the optical fiber 17.

The photonic crystals 12, 13 and 14 may be the same as that shown in FIGS. 3A and 3B, and have the composition and the structure already mentioned. An $SiO_2$ buffer is positioned on an Si substrate, and $SiO_2$ layers and amorphous Si (a-Si) layers both having the shapes reflecting the concave-convex of the triangular lattice of the $SiO_2$ buffer are alternately and periodically layered on the $SiO_2$ buffer. These three photonic crystals is are selectively disposed in the respective directions for obtaining a bundle of parallel rays, divergence and crooking.

A diffraction index of $SiO_2$ is 1.46 and that of a-Si is 3.24, and 20 pairs of these layers both having a thickness of 0.16 micronmeter are layered. A lattice constant (interlattice pitch) in the surface is 0.33 micronmeter. A wavelength of incident rays is 0.956 micronmeter and a standardized frequency determined by these structural constants is 0.33.

The dispersion surface at this moment is as shown in FIGS. 4A and 4B, and the relation between the divergent angle and the incident angle of the propagation ray shown in FIG. 5 is obtained from this dispersion surface. When the divergent angle of the incident ray is assumed to be 4 degree, the propagation rays spreading in fan-shaped having an angle of about 70 degrees as shown in FIG. 6A in case of the incident angle of 8 degrees, and propagate as a bundle of parallel rays as shown in FIG. 6B in case of the incident angle of 15 degrees.

Then, the operation of the self-waveguide optical circuit of Embodiment 1 will be described referring to FIG. 7.

The exit rays from the razor 11 are incident on the first photonic crystal 12. The crystal direction is selected to have the direction "b" shown in FIG. 4A. Since the exit angle from the razor is 4 degrees, the propagation rays in the crystal are a bundle of parallel rays.

Thereafter, the rays are incident on the second photonic crystal 13 to diverge into two bundles of rays having an angle of about 60 degrees therebetween. This condition corresponds to "c" of FIG. 4A.

One of the two bundles of rays is directly incident on the optical fiber 17. The other bundle of rays is incident on the third photonic crystal 14, and is again crooked to be parallel to original and is incident on the receptor element 16. The third photonic crystal 14 even employing the condition of "b" of FIG. 4A provides the crooking because the crystal direction is rotated by 60 degrees.

Under such a configuration, the incident rays from the razor 11 propagate along the optical path 18 in the optical circuit substrate 15 and are separately incident on the receptor element 16 and on the optical fiber 17.

Accordingly, the rays can be incident on the optical fiber 17 while partially monitoring the output strength of the razor 11 by the receptor element 16. Although the three photonic crystals 12, 13 and 14 are separately disposed for the sake of description, they are connected without a space for a practical purpose.

Embodiment 2

Figure 8:
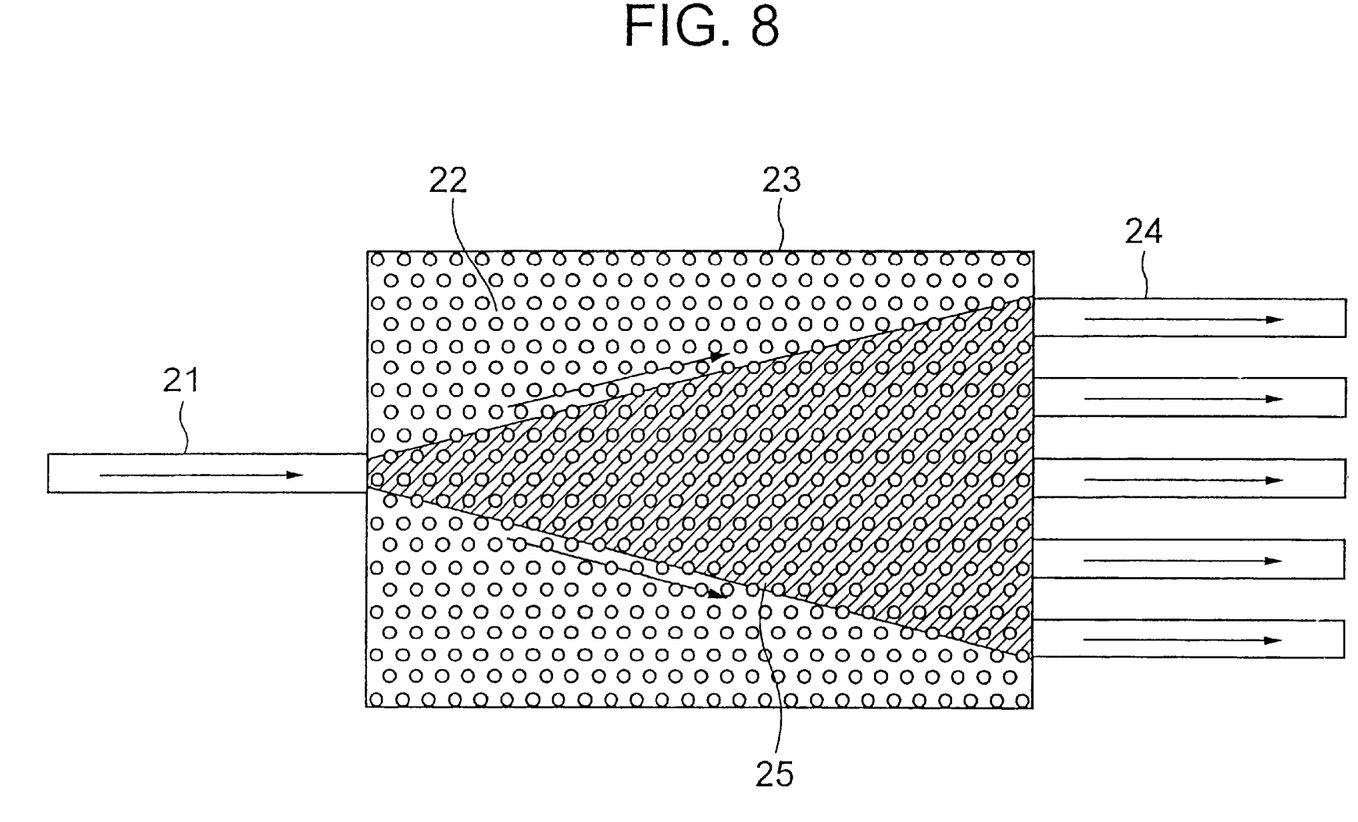
FIG. 8 is a schematic view showing Embodiment 2 of a self-waveguide optical circuit in accordance with the present invention.

A self-waveguide optical circuit of a second embodiment shown in FIG. 8 has an optical circuit substrate 23 forming a photonic crystal 22 on the whole surface, an incident ray side-optical fiber 21 and exit side-optical fibers 24. The structure of the photonic crystal 22 may be the same as that shown in FIGS. 3A, 3B and 3C. However, the direction of the photonic crystal 22 is selected to have the condition of "a" in FIG. 4A.

Then, the operation of the self-waveguide optical circuit of Embodiment 2 will be described referring to FIG. 8.

The exit rays from the incident ray side-optical fiber 21 are incident on the photonic crystal 22. The rays spreading in fan-shape as shown in FIG. 6A because the crystal direction is selected to have the direction "a" shown in FIG. 4A.

The propagation rays spreading in fan-shape as shown at 25 are separately incident on a plurality of the exit side-optical fibers 24 disposed on the opposite side. The exit rays from the photonic crystal advantageously have an excellent optical coupling with the exit side-optical fibers 24 because the propagation angle of the incident rays is preserved.

Although the photonic crystals having the tertiary periodic structure are employed in Embodiments 1 and 2, secondary periodic photonic crystals having diffraction index distribution in the shape of secondary periodic array may be employed to obtain a similar effect.

Another periodic structure using square lattices in place of the triangular lattices is expected to have a similar effect, and a semi-periodic structure such as penrose-tiling or a mosaic structure (amorphous structure) employing liquid crystals is also expected to have an effect similar to that of the periodic structure.

Although the photonic crystals are divided block-wise in Embodiment 1, they may be divided to have step-wise distribution for obtaining a similar effect. The effective introduction of the rays into the exit side-optical fibers 24 may be possible by producing step-wise distribution or by combining with an effect of a convex lens in Embodiment 2.

Although the periodic structure including the Si layers and the $SiO_2$ layers is employed in Embodiments 1 and 2, a similar effect is expected when two or more mediums having dielectric constants largely different from one another are employed. For example, in the structures of these Embodiments, a similar effect can be obtained by using a periodic structure including Si layers and air layers formed by selectively etching only the $SiO_2$ layers.

Since the above embodiments are described only for examples, the present invention is not limited to the above embodiments and various modifications or alternations can be easily made therefrom by those skilled in the art without departing from the scope of the present invention.

What is claimed is:

1. A self-waveguide optical circuit comprising:

a light source;

one or more photonic crystals having a dielectric constant-periodic structure or a dielectric constant-semi-periodic structure having a period substantially corresponding to a wavelength of propagation rays input from said light source;

one or more optical paths formed by establishing crystal directions of said photonic crystals for leveling dispersion surfaces of said photonic crystals for obtaining a bundle of parallel rays having a high degree of parallel in a self-guided mode; and one or more optical receptors receiving said propagation rays, wherein said rays are widely distributed by intentionally shifting the conditions of producing parallel rays for selecting said crystal direction of forming a convex dispersion surface to generate rays having a desired spread.

2. A self-waveguide optical circuit comprising:

a light source;

one or more photonic crystals having a dielectric constant-periodic structure or a dielectric constant-semi-periodic structure having a period substantially corresponding to a wavelength of propagation rays input from said light source;

one or more optical paths formed by establishing crystal directions of said photonic crystals for leveling dispersion surfaces of said photonic crystals for obtaining a bundle of parallel rays having a high degree of parallel in a self-guided mode; and one or more optical receptors receiving said propagation rays, wherein the rays are focused by intentionally shifting the conditions of producing parallel rays for selecting said crystal direction of forming a concave dispersion surface to generate focused rays.

* * * * *